United States Patent [19]

Henning et al.

[11] Patent Number: 4,623,416

[45] Date of Patent: Nov. 18, 1986

[54] AQUEOUS SOLUTIONS OR DISPERSIONS OF POLYISOCYANATE POLYADDITION PRODUCTS, A PROCESS FOR THEIR PRODUCTION AND THEIR USE AS, OR IN THE PRODUCTION OF, ADHESIVES

[75] Inventors: Wolfgang Henning, Kuerten; Rudolf Hombach, Leverkusen; Walter Meckel, Neuss; Helmut Reiff, Leverkusen, all of Fed. Rep. of Germany

[73] Assignee: Bayer Aktiengesellschaft, Leverkusen, Fed. Rep. of Germany

[21] Appl. No.: 675,042

[22] Filed: Nov. 26, 1984

[30] Foreign Application Priority Data

Dec. 10, 1983 [DE] Fed. Rep. of Germany ....... 3344693

[51] Int. Cl.$^4$ .................... C09J 3/14; C08G 18/44
[52] U.S. Cl. .................... 156/331.7; 524/591; 524/839; 524/840; 428/424.8
[58] Field of Search .................... 524/591, 839, 840; 156/331.7

[56] References Cited

U.S. PATENT DOCUMENTS

| | | | |
|---|---|---|---|
| 3,036,998 | 5/1962 | Rudner | 260/77.5 |
| 3,461,103 | 8/1969 | Keberle et al. | 260/75 |
| 3,479,310 | 11/1969 | Dieterich et al. | 260/29.2 TN |
| 3,480,592 | 11/1969 | Dieterich et al. | 260/77.5 |
| 3,553,173 | 1/1971 | Wieden et al. | 260/77.5 |
| 3,686,108 | 8/1972 | Reiff et al. | 260/29.2 TN |
| 3,756,992 | 9/1973 | Dieterich | 260/77.5 Q |
| 4,066,591 | 1/1978 | Scriven | 260/29.2 |
| 4,092,286 | 5/1978 | Noll | 524/591 |
| 4,108,814 | 8/1978 | Reiff et al. | 260/29.2 TN |
| 4,237,264 | 12/1980 | Noll | 524/591 |
| 4,238,378 | 12/1980 | Markush | 524/591 |
| 4,293,474 | 10/1981 | Dieterich | 524/591 |
| 4,331,717 | 5/1982 | Wenzel et al. | 427/389.7 |
| 4,408,008 | 10/1983 | Markusch | 524/591 |
| 4,540,633 | 9/1985 | Kucera | 524/839 |
| 4,558,090 | 10/1985 | Drexler | 524/591 |

FOREIGN PATENT DOCUMENTS

| | | |
|---|---|---|
| 717432 | 12/1968 | Belgium . |
| 3521 | 1/1979 | European Pat. Off. . |
| 880485 | 6/1953 | Fed. Rep. of Germany . |
| 1044404 | 2/1957 | Fed. Rep. of Germany . |
| 1134946 | 8/1962 | Fed. Rep. of Germany . |
| 2804603 | 8/1979 | Fed. Rep. of Germany . |
| 3139966 | 4/1983 | Fed. Rep. of Germany . |
| 1148244 | 4/1969 | United Kingdom . |
| 1191260 | 5/1970 | United Kingdom . |
| 1336050 | 11/1973 | United Kingdom . |

*Primary Examiner*—C. Warren Ivy
*Attorney, Agent, or Firm*—Gene Harsh; Joseph C. Gil; Thomas W. Roy

[57] ABSTRACT

The present invention relates to aqueous solutions or dispersions of polyisocyanate polyaddition products containing from about 2 to 200 milliequivalents per 100 g of solids of chemically incorporated, ternary or quaternary ammonium groups and up to about 25%, based on solids, of incorporated ethylene oxide units present within terminally and/or laterally arranged polyether chains, characterized in that the polyisocyanate polyaddition products contain from about 20 to 95% by weight of polyester segments Q incorporated through urethane groups, wherein Q represents a radical of the type obtained by removing the hydroxyl groups from
(i) dicarboxylic acid polyester polyols having a molecular weight in the range from about 700 to 1400 and/or (ii) hydroxyl-terminated lactone homopolymers or copolymers having a molecular weight in the range from about 700 to 2500.

The present invention also relates to the preparation of these polyisocyanate polyaddition products and their use for bonding substrates, in particular rubber.

8 Claims, No Drawings

AQUEOUS SOLUTIONS OR DISPERSIONS OF POLYISOCYANATE POLYADDITION PRODUCTS, A PROCESS FOR THEIR PRODUCTION AND THEIR USE AS, OR IN THE PRODUCTION OF, ADHESIVES

BACKGROUND OF THE INVENTION

1. Field of the Invention

This invention relates to aqueous solutions or dispersions of special polyisocyanate polyaddition products which, by virtue of the choice of the polyhydroxyl compounds used for their production, are eminently suitable for use as adhesives, particularly for rubber, to a process for producing the aqueous solutions or dispersions and to their use as, or in the production of, adhesives.

2. Description of the Prior Art

Aqueous solutions or dispersions of polyisocyanate polyaddition products, i.e. aqueous solutions or dispersions of polyurethanes or polyurethane polyureas, are known. Their production is described, for example, in the following literature references: DE-PS No. 880,485, DE-AS No. 1,044,404, U.S. Pat. No. 3,036,998, DE-PS No. 1,178,586, DE-PS No. 1,134,946, DE-AS No. 1,237,306, DE-OS No. 1,595,602, U.S. Pat. No. 3,756,992, DE-OS No. 2,019,324, DE-OS No. 2,035,732, DE-OS No. 2,446,440, U.S. Pat. No. 3,479,310 and Angewandte Chemie 82, 35 (1970).

The known aqueous solutions or dispersions are suitable for a variety of applications, including inter alia the coating and bonding of any substrates. One disadvantage of the known solutions or dispersions lies in the fact that they are only suitable to a limited extent for bonding polymers, particularly rubber, to themselves and to other materials.

The aqueous solutions or dispersions described in DE-OS No. 2,804,603 and in EP-OS No. 3521, which were specifically developed as adhesives for rubber, are also not entirely satisfactory in that respect.

Accordingly, an object of the present invention is to provide new aqueous solutions or dispersions of polyisocyanate polyaddition products which are more suitable as adhesives for any substrates, particularly for rubber materials, than the solutions or dispersions of the prior art.

Surprisingly, this object is achieved by the solutions or dispersions according to the invention which are described in detail hereinafter and by the process according to the invention for their production. Bonds formed with the solutions or dispersions according to the invention, especially rubber-to-rubber bonds and bonds joining rubber to other materials, show separation strengths which exceed practical requirements, so that the bonded materials often cannot be separated without tearing.

SUMMARY OF THE INVENTION

The present invention relates to aqueous solutions or dispersions of polyisocyanate polyaddition products containing from about 2 to 200 milliequivalents per 100 g of solids of chemically incorporated, ternary or quaternary ammonium groups and up to about 25%, based on solids, of incorporated ethylene oxide units present within terminally and/or laterally arranged polyether chains, characterized in that the polyisocyanate polyaddition products contain from about 20 to 95% by weight of polyester segments Q incorporated through urethane groups, wherein Q represents a radical of the type obtained by removing the hydroxyl groups from (i) dicarboxylic acid polyester polyols having a molecular weight in the range from about 700 to 1400 and/or (ii) hydroxyl-terminated lactone homopolymers or copolymers having a molecular weight in the range from about 700 to 2500.

The present invention also relates to a process for producing these aqueous solutions or dispersions by preparing a prepolymer by reacting (a) organic polyisocyanates, optionally in conjunction with small quantities of organic monoisocyanates, with (b) organic polyhydroxyl compounds having a molecular weight in the range from about 500 to 5000 which are composed of (b1) polyester polyols and, optionally, (b2) other polyols, (c) optionally polyhydric alcohols having a molecular weight in the range from 62 to 499 in a quantity of up to about 60 hydroxyl equivalent percent, based on the total quantity of components (b) and (c), and (d) optionally monohydric alcohols containing ethylene oxide units incorporated within polyether chains wherein (a) is reacted with (b), (c) and (d) at an NCO-:OH-equivalent ratio of about 1.2:1 to 2.5:1, followed by chain extension of the resulting prepolymers containing isocyanate groups with (e) amine- or hydrazine-containing chain-extending agents at an NCO/NH-equivalent ratio of about 0.8:1 to 2.5:1, (i) at least some of the synthesis components (b2), (c) and/or (e) containing incorporated ternary or quaternary ammonium groups or tertiary amino groups convertible into such groups which are at least partly converted into ternary or quaternary ammonium groups before, during or after the reaction of the prepolymers and component (e), so that the polyisocyanate polyaddition products contain from 2 to 200 milliequivalents of ammonium groups per 100 g of solids, (ii) using (1) organic dihydroxy compounds containing lateral ethylene oxide units present within polyether chains as component (b2) and/or (2) compounds of the type mentioned in (d) in such quantities that the polyisocyanate polyaddition products contain up to about 25% by weight, based on solids, of ethylene oxide units present within terminally and/or laterally arranged polyether chains, and (iii) the synthesis of the polyisocyanate polyaddition products being carried out in the absence of water, followed by dissolution or dispersion in water, or the chain-extending reaction being carried out by reacting the prepolymers containing isocyanate groups with component (e) in aqueous medium, characterized in that at least about 50 hydroxyl equivalent percent of component (b1) are dicarboxylic acid polyester polyols having a molecular weight in the range from about 700 to 1400 and/or hydroxyl-terminated homopolymers or copolymers of lactones having a molecular weight of from about 700 to 2500.

Finally, the present invention also relates to the use of the new solutions or dispersions as adhesives or for the production of adhesives for any substrates, particularly for bonding rubber-to-rubber or to other materials.

DETAILED DESCRIPTION OF THE INVENTION

Organic polyisocyanates suitable as starting materials (a) for the process according to the invention are any organic compounds which contain at least two free isocyanate groups. It is preferred to use diisocyanates X(NCO)$_2$ where X is an aliphatic hydrocarbon radical containing from 4 to 12 carbon atoms, a cycloaliphatic hydrocarbon radical containing from 6 to 15 carbon atoms, an aromatic hydrocarbon radical containing from 6 to 15 carbon atoms or an araliphatic hydrocarbon radical containing from 7 to 15 carbon atoms. Examples of preferred diisocyanates such as these are tetramethylene diisocyanate, hexamethylene diisocyanate, dodecamethylene diisocyanate, 1,4-diisocyanatocyclohexane, 1-isocyanato-3,3,5-trimethyl-5-isocyanatomethylcyclohexane (isophorone diisocyanate or IPDI), 4,4'-diisocyanatodicyclohexylmethane, 2,2-bis-(4-isocyanatocyclohexyl)-propane, 1,4-diisocyanatobenzene, 2,4-diisocyanatotoluene, 2,6-diisocyanatotoluene, 4,4'-diisocyanatodiphenylmethane, p-xylylene diisocyanate and mixtures of these compounds.

It is of course also possible to use the higher polyisocyanates known per se in polyurethane chemistry or even modified polyisocyanates known per se, for example polyisocyanates containing carbodiimide groups, allophanate groups, isocyanurate groups, urethane groups and/or biuret groups.

Monoisocyanates, such as for example phenylisocyanate, hexylisocyanate or dodecylisocyanate, may also be used in small quantities, i.e. in quantities of to about 10 NCO-equivalent percent, in the production the polyaddition product, although in this case premature chain termination must be prevented by the simultaneous use of synthesis components having a functionality of higher than two.

Reactants for the polyisocyanates (a) are (b) organic polyhydroxyl compounds having a molecular weight in the range from 500 to about 5000, optionally (c) organic polyhydroxyl compounds having a molecular weight in the range from 62 to 499, optionally (d) monohydric alcohols having a molecular weight in the range from about 800 to 10,000 and containing ethylene oxide units incorporated within polyether chains and (e) aminecontaining or hydrazine-containing chain-extending agents.

The organic polyhydroxyl compounds (b) having a molecular weight in the range from 500 to about 5000 are (b1) polyester polyols having a molecular weight in the range in question and, optionally, (b2) other polyols having a molecular weight in the range in question of the type known per se from polyurethane chemistry. In this connection, it is important that the polyester polyols (b1) should be used in such quantities in the process according to the invention and should have such a composition that from about 20 to 95% by weight and preferably from about 25 to 80% by weight of polyester segments Q of the type mentioned above incorporated through urethane groups are ultimately present in the polyisocyanate polyaddition products obtained. This means that it is crucially important that at least about 50 hydroxyl equivalent percent and preferably at least about 80 hydroxyl equivalent percent of the polyester polyols (b1) should be dicarboxylic acid polyester polyols, particularly dicarboxylic acid polyester diols having a molecular weight in the range from about 700 to 1400, and/or hydroxyl-terminated homopolymers or copolymers of lactones having a molecular weight in the range from about 700 to 2500, and that the total quantity of component (b1) should be gauged in such a way as to give the content essential to the invention of structural units Q essential to the invention.

The above-mentioned dicarboxylic acid polyester polyols, particularly diols, are preferably those of the type in which at least about 50 carboxyl equivalent percent of the dicarboxylic acid component and, more preferably, the entire dicarboxylic acid component is based on adipic acid and preferably at least about 50 hydroxyl equivalent percent of the polyol component and, more preferably, the entire polyol component is based on 1,6-dihydroxyhexane. In addition to these preferred synthesis components, the polyester polyols essential to the invention may also contain other synthesis components of the type mentioned by way of example hereinafter. The homopolymers or copolymers of lactones are preferably difunctional, hydroxyl-terminated adducts of lactones or lactone mixtures (such as ε-caprolactone, β-propiolactone, γ-butyrolactone and-/or methyl-ε-caprolactone) with suitable difunctional starter molecules such as the low molecular weight, dihydric alcohols mentioned hereinafter as synthesis component for the polyester polyols. The corresponding polymers of ε-caprolactone are particularly preferred. Lower polyester diols or polyether diols may also be used as starters for producing the lactone polymers. To be suitable for use in accordance with the invention, at least about 50% by weight of the lactone polymers must be based on polymerized lactones or polycondensed ω-hydroxycarboxylic acids corresponding to the lactones. It follows from this requirement that the corresponding, chemically completely equivalent polycondensates of the hydroxycarboxylic acids corresponding to the lactones may be used instead of the lactone polymers.

In addition to these polyester polyols essential to the invention, component (b1) may also contain other polyester polyols having molecular weights in the range from about 500 to 5000 of the type known per se from polyurethane chemistry. These polyester polyols are the reaction products known per se of polyhydric, preferably dihydric and, optionally, also trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example by halogen atoms, and/or unsaturated. Examples of polycarboxylic acids such as these are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids (such as oleic acid, optionally in admixture with monomeric fatty acids), terephthalic acid dimethyl ester and terephthalic acid-bis-glycol ester. Suitable polyhydric alcohols include ethylene glycol, 1,2- and 1,3-propylene glycol, 1,4-, 1,3- and 2,3-butylene glycol, 1,6-hexane diol, 1,8-octane diol, neopentyl glycol, cyclohexane dimethanol (1,4-bis- (hydroxymethyl)-cyclohexane), 2-methyl-1,3-propane diol, glycerol, trimethylol propane, 1,2,6-hexane triol, 1,2,4-butane triol, trimethylol ethane, diethylene glycol, triethylene glycol, tetraethylene glycol, polyethylene glycol, dipropylene glycol, polypropylene glycol, dibutylene glycol and polybutylene glycol. The polyesters may contain terminal carboxyl groups. Polyesters of lactones which do not correspond to the compounds essential to the invention with regard to their molecular weight (for example polyesters of ε-caprolactone, or hydroxycarboxylic acids such as ω-hydroxycaproic acid) may also be used.

Polycarbonates containing hydroxyl groups may also be a constituent of the polyester polyol component (b1), for example those of the type obtainable by reacting diols such as 1,3-propane diol, 1,4-butane diol, 1,6-hexane diol, diethylene glycol, triethylene glycol and/or tetraethylene glycol with phosgene or diaryl carbonates such as diphenyl carbonate.

In addition to the starting materials (b1) mentioned by way of example, component (b) may optionally contain other hydroxyl compounds (b2) having a molecular weight in the range from about 500 to 5000. Examples of these other hydroxyl compounds (b2) include the polyether polyols, particularly diols, known per se from polyurethane chemistry and obtainable by polymerizing epoxides (such as ethylene oxide, propylene oxide, butylene oxide, tetrahydrofuran, styrene oxide or epichlorohydrin) on their own, for example in the presence of $BF_3$, or by the addition of these epoxides, optionally in admixture or successively, with starter components containing reactive hydrogen atoms such as alcohols and amines. Examples include water, ethylene glycol, 1,3- or 1,2-propylene glycol, 4,4'-dihydroxydiphenyl propane and aniline. Organic dihydroxy compounds containing ethylene oxide units incorporated within laterally arranged polyether chains of the type mentioned above may also be used as synthesis component (b2) in the process according to the invention in order to incorporate hydrophilic, lateral polyether chains in the end products of the process Synthesis component (c) optionally used in the process according to the invention includes organic, preferably difunctional and/or trifunctional, more particularly difunctional, polyhydroxyl compounds having a molecular weight in the range from 62 to 499 and preferably in the range from 62 to about 250. These compounds are generally used in a quantity of from 0 to about 60 hydroxyl equivalent percent, based on the total quantity of components (b) and (c). These synthesis components (c) are either nitrogen-free polyols optionally containing ether or ester groups or amino alcohols containing at least two hydroxyl groups and tertiary amine nitrogen atoms of which the tertiary nitrogen atoms may be converted at least partly into ternary or quaternary ammonium groups by neutralization or quaternization during or on completion of the isocyanate polyaddition reaction Synthesis components (c) of the type mentioned first include simple polyhydric alcohols such as ethylene glycol, propylene glycol, 1,3-propane diol, 1,4-butane diol, 1,6-hexane diol, trimethylol propane or glycerol. Low molecular weight polyester diols such as adipic acid-bis-(hydroxyethyl)-ester, or low molecular weight diols containing ether groups such as diethylene glycol, triethylene glycol, tetraethylene glycol, dipropylene glycol, tripropylene glycol or tetrapropylene glycol, may also be used as the nitrogen-free synthesis component (c). Suitable amino alcohols include such compounds as N-methyl diethanolamine, N-methyl diisopropanolamine, N-ethyl diethanolamine, N-ethyl diisopropanolamine or N,N'-bis-(2-hydroxyethyl)-perhydropyrazine.

Synthesis component (d) which may optionally be used in accordance with the invention includes monohydroxy polyether alcohols having a molecular weight in the range of about 800 to 10,000 and preferably in the range of about 1000 to 5000 and may be obtained by alkoxylating monofunctional starter molecules such as methanol, ethanol or n-butanol with alkoxylating agents such as ethylene oxide or mixtures of ethylene oxide with other alkylene oxides, in particular propylene oxide. Where alkylene oxide mixtures are used, however, they should contain at least about 40 mole percent and preferably at least about 65 mole percent of ethylene oxide. When used, synthesis component (d) is intended to incorporate hydrophilic ethylene oxide units within polyether chains at the terminal position in the end products of the process according to the invention.

The synthesis component (e) used in accordance with the invention is an amine-containing or hydrazinecontaining chain-extending agent or crosslinking agent having a molecular weight in the range from 32 to 500 and preferably in the range from about 60 to 300. This group also includes both compounds containing tertiary amino groups, i.e. potential ternary or quaternary ammonium groups, and also polyamines which do not contain any tertiary amino groups. The group mentioned first includes, for example, such compounds as N-methyl-bis-(3-aminopropyl)-amine, N-methyl-bis-(2-aminoethyl)-amine or N,N',N''-trimethyldiethylene triamine. Amine- or hydrazine-containing chain-extending agents which do not contain any tertiary amino groups are, for example, ethylene diamine, hexamethylene diamine, piperazine, 2,5-dimethyl piperazine, 1-amino-3-aminomethyl-3,5,5-trimethyl cyclohexane (isophoronediamine or IPDA), 4,4'-diaminodicyclohexylmethane, 1,4-diaminocyclohexane, 1,2-diaminopropane, hydrazine, hydrazine hydrate, amino-acid hydrazides (such as 2-aminoacetic acid hydrazide) or bis-hydrazides (such as succinic acid bis-hydrazide).

Among the amine- or hydrazine-containing chain extending agents, it is particularly those which do not contain any tertiary nitrogen which may be used in blocked form in the process according to the invention, i.e. in the form of the corresponding ketimines (DE-OS No. 2,725,589), ketazines (DE-OS No. 2,811,148, U.S. Pat. No. 4,269,748) or amine salts (U.S. Pat. No. 4,292,226). Oxazolidines, of the type used for example in accordance with DE-OS No. 2,732,131 or U.S. Pat. No. 4,192,937, also represent blocked diamines which may be used for chain extending the NCO-prepolymers in the process according to the invention in a manner similar to those set forth in the prior publications mentioned. Where blocked diamines such as these are used, they are generally mixed with the NCO-prepolymers in the absence of water and the resulting mixture is subsequently mixed with the dispersion water or with some of the dispersion water, so that the corresponding diamines are intermediately released by hydrolysis.

Other representative compounds which may be used as synthesis components (a), (b) or (c) in the process according to the invention are described, for example, in High Polymers, Vol. XVI, "Polyurethanes, Chemistry and Technology" by Saunders-Frisch, Interscience Publishers, New York/London, Vol. I, 1962, pages 32 to 42 and pages 44 to 54 and Vol. II, 1964, pages 5 to 6 and 198 to 199, and in Kunststoff-Handbuch, Vol. VII, Vieweg-Hochtlen, Carl-Hanser-Verlag, Munich, 1966, for example on pages 45 to 71.

Compounds having a functionality of three or more in the context of the isocyanate polyaddition reaction may be used in small quantities to obtain a certain degree of branching. As already mentioned, trifunctional or higher polyisocyanates may be used for the same purpose. Monohydric alcohols such as n-butanol, n-dodecanol or stearyl alcohol, may also be used in small quantities.

In the process according to the invention, the ionic groups, i.e. the ternary or quaternary ammonium groups are preferably incorporated using synthesis components (c) and/or (e) containing tertiary amino groups with subsequent conversion of the tertiary amino groups into the corresponding ammonium groups by neutralization with inorganic or organic acids such as hydrochloric acid, acetic acid, fumaric acid, maleic acid, lactic acid, tartaric acid, oxalic acid or phosphoric acid, or by quaternization with suitable quaternizing agents such as methyl chloride, methyl iodide, dimethyl sulfate, benzyl chloride, chloroacetic acid ethyl ester or bromoacetamide. In principle, this neutralization or quaternization of the synthesis components containing tertiary nitrogen may even be carried out before or during the isocyanate polyaddition reaction, although this is not recommended. It is also possible to introduce ternary or quaternary ammonium groups into the polyisocyanate polyaddition products through polyether polyols containing tertiary amino groups of the type used as synthesis component (b2), followed by neutralization or quaternization of the tertiary amino groups. However, this also is not a preferred embodiment of the process according to the invention.

In all the variants of the process according to the invention, the quantity in which the synthesis components containing tertiary amino groups or ammonium groups are used and also the degree of neutralization or quaternization is selected in such a way that from about 2 to 200, preferably from about 2 to 100 and, more preferably, from about 5 to 50 milliequivalents of ternary or quaternary ammonium groups per 100 g of solids are present in the products obtained by the process according to the invention.

In addition to ammonium groups of the type in question, ethylene oxide units present within terminally and/or laterally arranged polyether chains may also be present as further hydrophilic structural units in the products obtained by the process according to the invention. Lateral hydrophilic polyether chains are preferably introduced by using synthesis components (b2) having a molecular weight in the range from about 500 to 5000 and preferably in the range from about 1000 to 3000 with lateral chains of which at least about 40 mole percent and preferably at least 65 mole percent are ethylene oxide units with the remainder preferably being propylene oxide units. Examples of hydrophilic synthesis components such as these are described in U.S. Pat. Nos. 3,905,929; 4,092,286 and 4,190,566. In principle, it is also possible to introduce lateral hydrophilic groups of the type in question through correspondingly modified diisocyanates, as described for example in U.S. Pat. No. 3,920,598, although this approach is less preferred. In the process according to the invention, terminal, hydrophilically modified polyether chains are preferably introduced using the starting materials described above in (d), as also described for example in U.S. Pat. No. 4,237,264 or in U.S. Pat. No 4,238,378. Although possible in principle, it is not preferred to use the hydrophilic monoisocyanates which are also described in these prior publications (in admixture with component (a)). The compounds of the type mentioned by way of example containing ethylene oxide units present within terminally and/or laterally arranged polyether chains are used, if at all, in such quantities that from 0 to about 25% by weight and preferably from about 0.5 to 10% by weight of ethylene oxide units incorporated within terminally and/or laterally arranged polyether chains are present in the products obtained by the process according to the invention. However, the total quantity of hydrophilic structural units (ammonium groups and ethylene oxide units of the last-mentioned type) must always be selected in such a way that the solubility or dispersibility of the products obtained by the process according to the invention in water is guaranteed. The process according to the invention is preferably carried out by initially preparing a prepolymer containing free isocyanate groups from starting components (a), (b), optionally (c) and optionally (d) either in the melt or in the presence of an inert solvent such as acetone or N-methyl pyrrolidone, for which purpose the starting materials mentioned are reacted in an NCO/OH-equivalent ratio kept between about 1 2:1 and 2.5:1 and preferably between about 1.2:1 and 2:1. The reaction temperature is generally in the range from about 5° to 160° C. and preferably in the range from about 50° to 100° C.

Thereafter, the NCO-prepolymers thus obtained are converted into the high molecular weight products by reaction with component (e), i.e. the amine- or hydrazine-containing chain-extending agents and, optionally, water. To this end, component (e), i.e. the amine- or hydrazine-containing chain-extending agent, is used in a quantity corresponding to an NCO/NH-equivalent ratio, based on isocyanate groups of the prepolymer on the one hand and reactive primary or secondary amino groups of the chain extending agents on the other hand, of from about 0 8:1 to 2.5:1 and preferably from about 0.8:1 to 2:1. This chain-extending reaction may be carried out in several different ways. Thus, it is possible to carry out the reaction of the NCO-prepolymers with component (e) in an inert solvent, such as acetone or N-methyl pyrrolidone, and to mix the organic solution obtained thoroughly with the dispersion water, optionally followed by removal of the solvent by distillation. In another variant, the NCO-prepolymers are mixed with blocked chain-extending agents (e) of the type mentioned by way of example in the foregoing and subsequently the resulting mixture is dispersed in water. In the first of the above-mentioned variants, the ammonium groups may be introduced, for example, by neutralization or quaternization of the tertiary amino groups before mixing with water or by using an aqueous solution of the acid as the neutralizing agent. In the second variant, it is possible, for example, to add the acid required for neutralization of the tertiary amino groups to the dispersion water. However, it would also be possible at least partly to convert tertiary amino groups present in the NCO-prepolymers before the reaction with the chain-extending agents (e) into ammonium groups simply by quaternization or neutralization or, although less preferable, to use synthesis components already containing ammonium groups in the production of the NCO-prepolymers.

The chain-extending reaction, i.e. the reaction of the NCO-prepolymers with component (e), and dispersion in water are generally carried out at a temperature in the range from about 20° to 100° C. and preferably at a temperature in the range from about 20° to 80° C.

The quantity of water used for dispersion is generally gauged in such a way as to provide about 10 to 60% by weight and preferably from 20 to 50% by weight solutions or dispersions of the polyisocyanate polyaddition products.

The solutions or dispersions according to the invention are characterized by the above-mentioned content of ternary or quaternary ammonium groups in the dissolved or dispersed solid and, more particularly, by the above-mentioned content of polyester segments essential to the invention. These polyester segments essential to the invention emanate from the use of dicarboxylic acid polyester polyols having a molecular weight in the range from about 700 to 1400 and/or of lactone homopolymers or copolymers of the type mentioned by way of example in the foregoing. These synthesis components essential to the invention may be described by the formula $Q(OH)_n$ where Q is a polyester residue of the type obtained by removing the hydroxyl group from a polyester polyol of the above-mentioned type and n is a whole or (on a statistical average) fractional number of from 2 to 3, preferably 2. Where incorporated lactone homopolymers or copolymers are present, at least 50% by weight of the residue Q is based on copolymerized lactone units, particularly copolymerized lactone units -O-X-CO- (where X represents the indifferent hydrocarbon residue of the particular lactone) emanating from the polymerization of e-caprolactone. The polyisocyanate polyaddition products present as solutions or dispersions in accordance with the invention generally contain from about 20 to 95% by weight and preferably from about 25 to 80% by weight of the residues Q.

In principle, it is also possible to produce aqueous solutions or dispersions of polyisocyanate polyaddition products according to the invention by the so-called melt dispersion process according to U.S. Pat. No. 3,756,992 or even by the process according to DE-OS No. 2,543,091. Providing the type of starting materials used and the quantities in which they are used are suitably selected, it is merely important to ensure that the resulting polyisocyanate polyaddition products satisfy the above-mentioned requirements in regard to the content of ammonium groups and polyester segments essential to the invention.

The solutions or dispersions of polyisocyanate polyaddition products according to the invention may be directly used as such for bonding any substrates. To obtain special properties, the dispersions according to the invention may be mixed with other dispersions, for example polyvinyl acetate dispersions. In addition, additives such as synthetic or natural resins, plasticizers and fillers may also be introduced.

The solutions or dispersions of polyisocyanate polyaddition products according to the invention are particularly suitable for rubber-to-rubber bonding and for bonding rubber to other materials. When they are used in accordance with the invention, the products obtained by the process according to the invention are applied by the methods known per se in adhesive technology for applying aqueous dispersion or solution adhesives.

In the following Examples, all the percentages quoted are percentages by weight unless otherwise indicated.

The dispersions were tested for their adhesive properties in accordance with DIN 53 273 using the same styrene-butadiene rubber sole material having a Shore-A-hardness of 90 (the Nora test material manufactured by the Freudenberg Company of Weinheim).

To test the adhesives, test specimens were made up from the test materials. Before applying the adhesive, the rubber material was thoroughly roughened with grade 40 emery paper. The adhesive was applied twice on both sides so that approximately 50 g/m², based on solids, of the adhesive was present in either side. The layers of adhesive were then irradiated for 4 minutes with 250 watt infra lamps arranged at a distance of 25 cm, after which the test specimens were placed on top of one another and pressed for 5 minutes at 0.35 MPa. After bonding, the test specimens were first left standing for 5 days at 23° C. The peel resistance values determined in the separation test carried out in accordance with DIN 53 273 (spindle advance 100 mm/minute: test temperature 23° C.) are shown in the following Table.

EXAMPLE 1

Ingredients:

A {
300 g of adipic acid-hexane diol polyester (molecular weight 840)
17.5 g of a butanol-started polypropylene oxide-polyethylene oxide polyether (molar ratio of propylene oxide to ethylene oxide = 17:83, molecular weight 2150)
}
0.33 g of trimethylol propane
72.9 g of hexamethylene diisocyanate
96.3 g of isophorone diisocyanate (IPDI)
19.3 g of 1,4-butane diol
1080 g of acetone
4.66 g of hydrazine hydrate
27.04 g of N—methyl-bis-(3-aminopropyl)-amine in 50 g of acetone
13.42 g of DL-lactic acid in 30 g of water
1260 g of deionized water Procedure:

Component A was dehydrated in vacuo with stirring for 30 minutes at 120° C. The polyisocyanates were added at 80° C. After a reaction time of 1 hour at 80° C., the 1,4-butane diol was added and the mixture was stirred at 95° to 100° C. until a constant NCO-value of 4.6% was obtained.

The acetone was then added dropwise to the hot melt with a condenser providing for adequate reflux. The clear acetone solution was cooled to 50° C. and subsequently chain extended with hydrazine hydrate and, after an interval of 5 minutes, with N-methyl-bis-(3-amino- propyl)-amine. After 5 minutes, DL-lactic acid was added at 50° C., followed after another 5 minutes by dispersion in water. The acetone was then removed by distillation, leaving a finely divided, non-sedimenting dispersion having a viscosity of 31.7 secs. (4 mm orifice Ford cup) and a solids content of 30%.

EXAMPLE 2

Ingredients:

A {
100 g of adipic acid-hexane diol polyester (molecular weight 840)
133.9 g adipic acid-butane diol polyester (molecular weight 2250)
11.5 g of a butanol-started polypropylene oxide-polyethylene oxide polyether (molar ratio of propylene oxide to ethylene oxide =

-continued

```
       17:83, molecular weight 2150)
  0.17 g of trimethylol propane
 36.5  g of hexamethylene diisocyanate
 48.3  g of isophorone diisocyanate
  9.6  g of 1,4-butane diol
1000   g of acetone
  2.1  g of hydrazine hydrate
 12.01 g of N—methyl-bis-(3-aminopropyl)-amine in
       50 g of acetone
  4.47 g of DL-lactic acid in 30 g of water
810    g of deionized water
```

Procedure:

See Example 1 (a constant NCO-value for the prepolymer was established at 3.1%).

A finely divided dispersion was obtained having a solids content of 32.7% and a Ford cup viscosity (4 mm orifice) of 13 seconds.

EXAMPLE 3

Ingredients:

```
A  ⎰  150   g of adipic acid-hexane diol polyester
   ⎱         (molecular weight 840)
      0.165 g of trimethylol propane
     36.5   g of hexamethylene diisocyanate
     48.2   g of isophorone diisocyanate
      9.63  g of 1,4-butane diol
    540     ml of acetone
      2.32  g of hydrazine hydrate
     13.4   g of N—methyl-bis-(3-aminopropyl)-amine in
             25 g of acetone
      5.0   g of DL-lactic acid in 15 g of water
    600     g of deionized water
```

Procedure:

See Example 1 (a constant NCO-value for the prepolymer was established at 4.8%).

A finely divided dispersion having a solids content of 37% and a Ford viscosity (4 mm orifice) of 15 seconds was obtained.

EXAMPLE 4

Ingredients:

```
      240    g of adipic acid-hexane diol polyester
              (molecular weight 840)
        8.75 g of a butanol-started polypropylene oxide-
A  ⎰         polyethylene oxide polyether (molar ratio
   ⎱         of propylene oxide to ethylene oxide =
              17:83; molecular weight 2150)
        0.17 g of trimethylol propane
       36.5  g of hexamethylene diisocyanate
       48.17 g of isophorone diisocyanate
     1000    ml of acetone
        2.22 g of hydrazine hydrate
       12.86 g of N—methyl-tris-(3-aminopropyl)-amine in
              50 g of acetone
        4.78 g of DL-lactic acid in 20 g of water
      810    g of water
```

Procedure:

See Example 1 (no addition of 1,4-butane diol). The constant NCO-value for the prepolymer was established at 3.35%.

A finely divided dispersion having a solids content of 32.4% and a Ford cup viscosity (4 mm orifice) of 13.1 seconds was obtained.

EXAMPLE 5

Ingredients:

```
      300   g of adipic acid-hexane diol polyester
             (molecular weight 840)
       17.5 g of a butanol-started polypropylene oxide:
A  ⎰        polyethylene oxide polyether (molar ratio
   ⎱        of propylene oxide to ethylene oxide =
             17:83; molecular weight 2150)
        0.33 g of trimethylol propane
       72.9  g of hexamethylene diisocyanate
       96.3  g of isophorone diisocyanate
       19.3  g of 1,4-butane diol
      900    g of acetone
```

Procedure:

The solution of the prepolymer in acetone (constant NCO-value=4.8%) was prepared in the same way as in Example 1 and subsequently divided into 3 parts. The further preparation of the three mixtures with the weighed portions indicated in the following was carried out in the same way as described in Example 1 with the DL-lactic acid in Example 1 being replaced in each case by the acid mentioned.

| a | b | c | |
|---|---|---|---|
| 359 g | 360 g | 635 g | of prepolymer in acetone |
| 1.1 g | 1.1 g | 1.95 g | of hydrazine hydrate |
| 6.38 g | 6.38 g | 11.28 g | of N—methyl-bis-(3-aminopropyl)-amine |
| 30 g | 30 g | 50 g | of acetone |
| 3.96 g | — | — | of tartaric acid |
| — | 3.33 g | — | of oxalic acid |
| — | — | 4.58 g | of phosphoric acid in 20 g of water |
| 330 g | 330 g | 580 g | of water |

Finely divided dispersions were obtained in each case and their respective solids contents amounted to 32.48% (a), 31.43% (b) and 31.57% (c).

EXAMPLE 6 (Comparison Example)

Ingredients:

```
      112   g of adipic acid-hexane diol polyester
             (molecular weight: 630)
        8.75 g of a butanol-started polypropylene
A  ⎰         oxide-polyethylene oxide polyether (molar
   ⎱         ratio of propylene oxide to ethylene
             oxide = 17:83; molecular weight 2150)
        0.17 g of trimethylol propane
       36.5  g of hexamethylene diisocyanate
       48.2  g of isophorone diisocyanate
        9.63 g of 1,4-butane diol
      700    ml of acetone
        2.14 g of hydrazine hydrate
       12.43 g of N—methyl-bis-(3-aminopropyl)-amine in
              25 g of acetone
        4.63 g of DL-lactic acid in 20 g of water
      500    g deionized water
```

Procedure:

See Example 1 (a constant NCO-value for the prepolymer was established at 5.02%).

A finely divided dispersion having a solids content of 32.7% and a Ford cup viscosity (4 mm orifice) of 13.1 seconds was obtained.

EXAMPLE 7 (Comparison Example)

Ingredients:

```
      257   g of adipic acid-hexane diol polyester
             (molecular weight 1440)
        8.75 g of a butanol-started polypropylene
A  ⎰         oxide-polyethylene oxide polyether (molar
```

-continued ratio of propylene oxide to ethylene
oxide = 19:83; molecular weight 2150)
0.17 g of trimethylol propane
36.5 g of hexamethylene diisocyanate
48.2 g of isophorone diisocyanate
9.63 g of 1,4-butane diol
900 ml of acetone
2.2 g of hydrazine hydrate
12.76 g of N—methyl-bis-(3-aminopropyl)-amine in
30 g of acetone
4.75 g of DL-lactic acid in 20 g of water
890 g of deionized water Procedure:

See Example 1 (a constant NCO-value for the prepolymer was established at 3.1%).

A finely divided dispersion having a solids content of 31% and a Ford cup viscosity (4 mm orifice) of 13 seconds was obtained.

EXAMPLE 8 (Comparison Example)

Ingredients:

A {
201 g of adipic acid-hexane diol polyester (molecular weight 2250)
8 g of a butanol-started polypropylene oxide-polyethylene oxide polyether (molar ratio of propylene oxide to ethylene oxide = 17:83; molecular weight 2150)
0.1 g of trimethylol propane
}
18.6 g of hexamethylene diisocyanate
24.6 g of isophorone diisocyanate
4.8 g of 1,4-butane diol
500 ml of acetone
1.16 g of hydrazine hydrate
6.75 g of N—methyl-bis-(3-aminopropyl)-amine in 25 g of acetone
2.5 g of DL-lastic acid in 10 g of water
615 g of deionized water Procedure:

See Example 1 (the constant NCO-value for the prepolymer was established at 2.3%).

A finely divided dispersion having a solids content of 32% and a Ford cup viscosity (4 mm orifice) of 12.5 seconds was obtained.

EXAMPLE 9 (Comparison Example)

Ingredients:

A {
150 g of adipic acid-hexane diol polyester (molecular weight 840)
8.75 g of a butanol-started polypropylene oxide-polyethylene oxide polyether (molar ratio of propylene oxide to ethylene oxide = 17:83; molecular weight 2150)
0.17 g of trimethylol propane
}
35.5 g of hexamethylene diisocyanate
48.2 g of isophorone diisocyanate
9.63 g of 1,4-butane diol
700 ml of acetone
4.37 g of hydrazine hydrate and
21.1 g of sodium ethylene diamino-2-ethane sulfonate (45% in water; AAS-solution) in 100 ml of deionized water
520 ml of deionized water Procedure:

The procedure was virtually the same as in Example 1. The NCO-prepolymer obtained has an NCO-value of 4.6% but, in contrast to Example 1, was extended with hydrazine hydrate and AAS-solution together in 100 ml of water. A finely divided dispersion having a solids content of 32% and a Ford cup viscosity (4 mm orifice) of 78 seconds was obtained.

EXAMPLE 10 (Comparison Example)

Ingredients:

A {
150 g of adipic acid-hexane diol polyester (molecular weight 840)
40 g of a butanol-started polypropylene oxide-polyethylene oxide polyether (molar ratio of propylene oxide to ethylene oxide = 17:83; molecular weight 2150)
0.2 g of trimethylol propane
}
37.4 g of hexamethylene diisocyanate
49.4 g of isophorone diisocyanate
9.63 g of 1,4-butane diol
700 ml of acetone
7.0 g of hydrazine hydrate
450 g of deionized water Procedure:

The prodedure was virtually the same as in Example 1. The NCO-prepolymer obtained has an NCO-value of 4.1% but, in contrast to Example 1, was only extended with hydrazine hydrate. A finely divided dispersion having a solids content of 42% and a Ford cup viscosity (4 mm orifice) of 21.5 seconds was obtained.

EXAMPLE 11

Ingredients:

A {
178.5 g of a difunctional OH—terminated poly-ε-caprolactone (molecular weight 1000)
8.75 g of a butanol-started polypropylene oxide-polyethylene oxide polyether (molar ratio of propylene oxide to ethylene oxide = 17:83; molecular weight 2150)
0.17 g of trimethylol propane
}
36.5 g of hexamethylene diisocyanate
48.2 g of isophorone diisocyanate
9.63 g of 1,4-butane diol
1000 ml of acetone
2.36 g o9f hydrazine hydrate
13.71 g of N—methyl-bis-(3-aminopropyl)-amine in 25 g of acetone
5.11 g of DL-lactic acid in 15 g of water
440 g of water Procedure:

See Example 1 (a constant NCO-value for the prepolymer was established at 4.23%).

A finely divided dispersion having a solids content of 41.36% and a viscosity of 37 seconds (Ford cup, 4 mm orifice) was obtained.

EXAMPLE 12

Ingredients:

A {
375 g of a difunctional, OH—terminated poly-ε-
8.75 g of a butanol-started polypropylene oxide-polyethylene oxide polyether (molar ratio of propylene oxide to ethylene oxide = 17:83; molecular weight 2150)
0.17 g of trimethylol propane
}
35.5 g of hexamethylene diisocyanate
48.2 g of isophorone diisocyanate
9.6 g of 1,4-butane diol
1000 ml of acetone
1.95 g of hydrazine hydrate
11.28 g of N—methyl-bis-(3-aminopropyl)-amine in 25 g of acetone
4.2 g of DL-lactic acid in 15 g of water -continued 1120 g of water Procedure:

See Example 1 (a constant NCO-value for the prepolymer was established at 2.93%).

A finely divided dispersion having a solids content of 31.7% and a viscosity of 17.7 seconds (Ford cup, 4 mm orifice) was obtained.

EXAMPLE 13 (Comparison Example)

Ingredients:

A
- 268 g of a difunctional, OH—terminated poly-ε-caprolactone (molecular weight 3000)
- 10 g of butanol-started polypropylene oxide-polyethylene oxide polyether (molar ratio of propylene oxide to ethylene oxide = 17:83; molecular weight 2150)

0.17 g of trimethylol propane
18.3 g of hexamethylene diisocyanate
24.12 g of isophorone diisocyanate
4.8 g of 1,4-butane diol
900 ml of acetone
1.13 g of hydrazine hydrate
6.55 g of N—methyl-bis-(3-aminopropyl)-amine in 30 g of acetone
3.25 g of DL-lactic acid in 15 g of water
780 g of water Procedure:

See Example 1 (a constant NCO-value for the prepolymer was established at 1.75%).

A finely divided dispersion having a solids content of 33% and a viscosity of 12 seconds (Ford cup, 4 mm orifice) was obtained.

Bond-strength testing using Nora test rubber

| Example No. | Polyester MW | Polylactone MW | Ion character | Peel strength after 7 days in kg/cm (DIN 53 273) |
|---|---|---|---|---|
| 1 | 840 | — | cationic | 7.0 tearing |
| 2 | 840 | — | cationic | 5.7 |
| 3 | 840 | — | cationic | 5.2 |
| 4 | 840 | — | cationic | 6.5 |
| 5a | 840 | — | cationic | 7.4 tearing |
| 5b | 840 | — | cationic | 8.4 tearing |
| 5c | 840 | — | cationic | 7.8 tearing |
| 6 | 630 | — | cationic | 3.0 |
| 7 | 1440 | — | cationic | 3.7 |
| 8 | 2250 | — | cationic | 2.7 |
| 9 | 840 | — | anionic | 0.8 |
| 10 | 840 | — | non-ionic | 3.0 |
| 11 | — | 1000 | cationic | 8.6 |
| 12 | — | 2000 | cationic | 6.1 |

-continued

Bond-strength testing using Nora test rubber

| Example No. | Polyester MW | Polylactone MW | Ion character | Peel strength after 7 days in kg/cm (DIN 53 273) |
|---|---|---|---|---|
| 13 | — | 3000 | cationic | 2.8 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for binding substrates wherein at least one substrate is rubber which comprises applying an aqueous solution or dispersion of polyisocyanate polyaddition products containing about 2 to 200 milliequivalents per 100 g of solids of chemically incorporated ternary or quaternary ammonium groups and up to about 25% by weight, based on solids, of incorporated ethylene oxide units present within terminally and/or laterally arranged polyether chains, wherein the polyisocyanate polyaddition products contain about 20 to 95% by weight of polyester segments Q incorporated through urethane groups, wherein Q represents a radical of the type obtained by removing the hydroxyl groups from
(i) diarboxylic acid polyester polyols having a molecular weight in the range of about 700 to 1400 and/or
(ii) hydroxyl-terminated lactone homopolymers or copolymers having a molecular weight in the range of about 1000 to 2000 to a first substrate and subseqently placing an additional substrate in contact with said first substrate.

2. The process of claim 1 wherein both substrates are rubber.

3. The process of claim 1 wherein said polyisocyanate polyaddition products contain about 0.5 to 10% by weight, based on solids, of incorporated ethylene oxide unis present within terminally and/or laterally arranged polyether 4. The process of claim 2 wherein said polyisocyanate polyaddition products contain about 0.5 to 10% by weight, based on solids, of incorporated ethylene oxide units present within terminally and/or laterally arranged polyether chains.

5. The process of claim 1 wherein Q represents an adipic acid-hexane diol polyester diol having a molecular weight of about 700 to 1400.

6. The process of claim 2 wherein Q represents an adipic acid-hexane diol polyester diol having a molecular weight of about 700 to 1400.

7. The process of claim 3 wherein Q represents an adipic acid-hexane diol polyester diol having a molecular weight of about 700 to 1400.

8. The process of claim 4 wherein Q represents an adipic acid-hexane diol polyester diol having a molecular weight of about 700 to 1400.

* * * * *